United States Patent [19]

Sakaguchi et al.

[11] Patent Number: 4,890,785
[45] Date of Patent: Jan. 2, 1990

[54] PREVENTIVE METHOD FOR PLATE DEFORMATION DUE TO WELDING IN FLAT PLATE WELDED STRUCTURE

[75] Inventors: Akira Sakaguchi, Kobe; Hideaki Koie, Akashi, both of Japan

[73] Assignee: Kawasaki Jukogyo Kabushiki Kaisha, Japan

[21] Appl. No.: 214,859

[22] Filed: Jul. 1, 1988

Related U.S. Application Data

[63] Continuation of Ser. No. 917,311, Oct. 10, 1986, abandoned, which is a continuation of Ser. No. 650,249, Sep. 13, 1984, abandoned.

[30] Foreign Application Priority Data

Sep. 16, 1983 [JP] Japan .................. 58-172010

[51] Int. Cl.$^4$ ................. B23K 31/02; B23P 11/02
[52] U.S. Cl. ....................... 228/232; 29/447; 29/448

[58] Field of Search ............ 29/447, 448; 228/200, 228/232, 175, 49.4

[56] References Cited

U.S. PATENT DOCUMENTS

| | | | |
|---|---|---|---|
| 2,329,938 | 9/1943 | Ortiz | 228/175 X |
| 2,342,025 | 2/1944 | Watter | 29/447 |
| 3,082,519 | 3/1963 | Ballentine et al. | 228/232 X |
| 3,769,675 | 11/1973 | Chartet | 228/232 X |
| 4,058,883 | 11/1977 | Yoshida et al. | 29/448 |

Primary Examiner—Nicholas P. Godici
Assistant Examiner—Carmine Cuda

[57] ABSTRACT

A preventive method for thin-gage plate deformation in manufacturing flat plate welded structures, which are constructed by welding thin-gage plates and frames and are used for side-plates, etc. in rolling stocks. The said method comprises preheating the whole thin-gage plate in a heating box for thermal expansion, and welding the thin-gage plate and the frame as the plate is expanded.

5 Claims, 8 Drawing Sheets

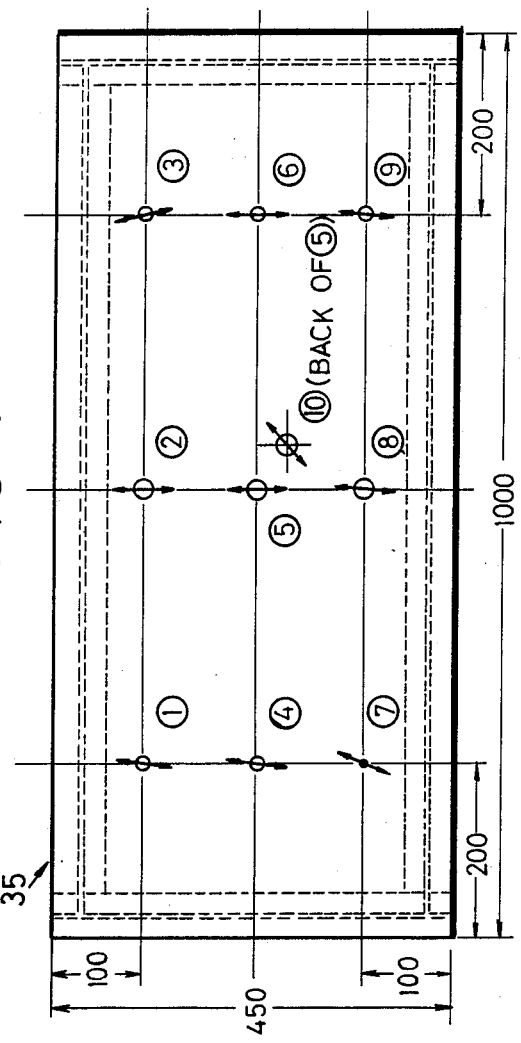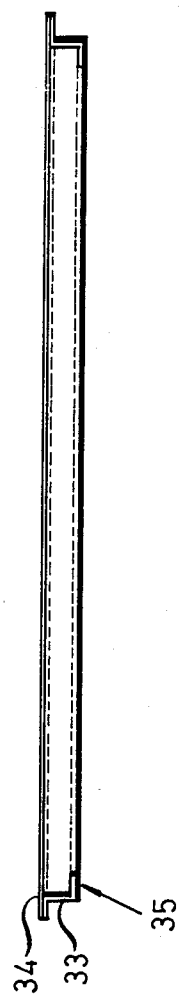

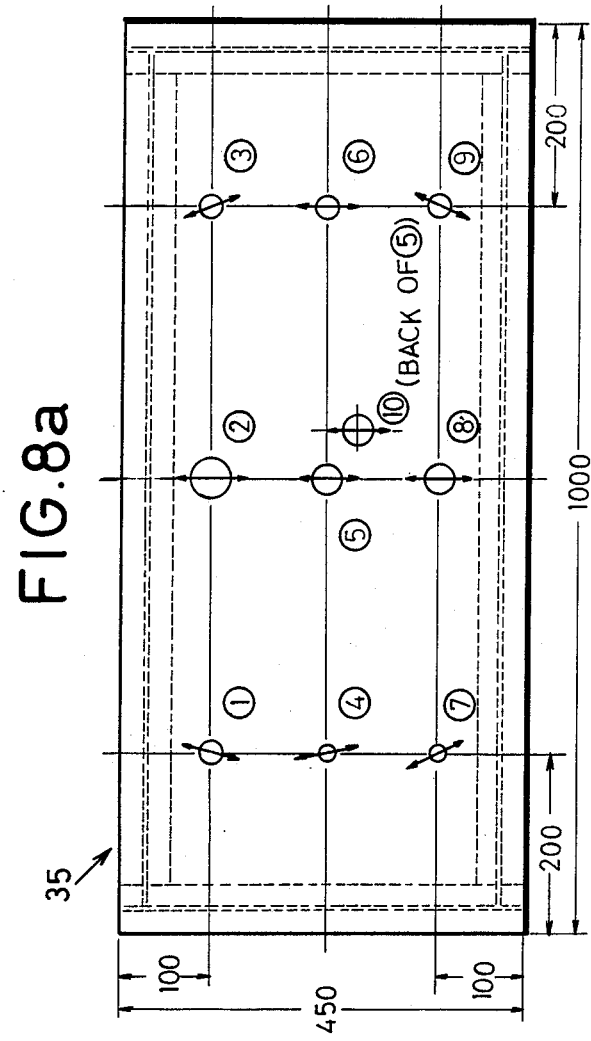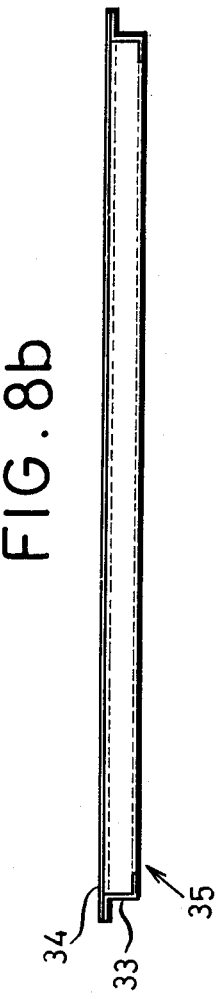

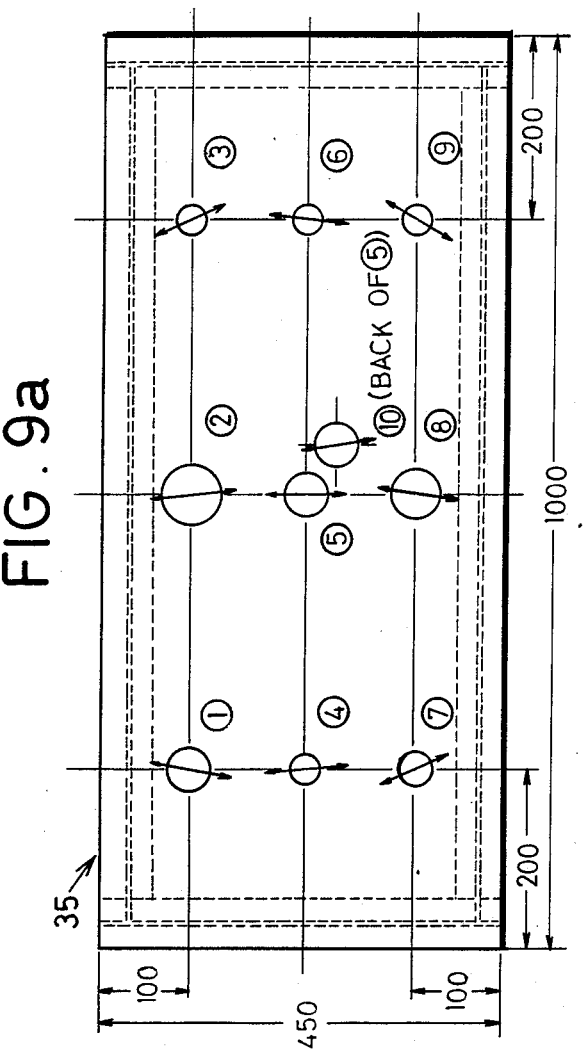
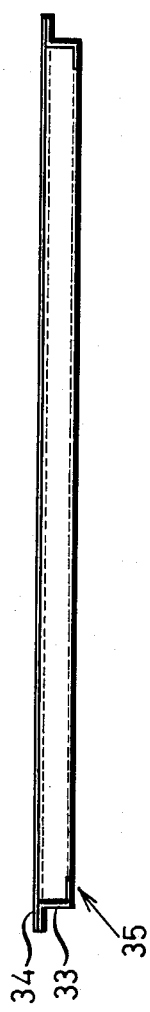
FIG. 9a
FIG. 9b

PREVENTIVE METHOD FOR PLATE DEFORMATION DUE TO WELDING IN FLAT PLATE WELDED STRUCTURE

This application is a continuation of application Ser. No. 917,311, filed Oct. 10, 1986, abandoned which is a continuation of Ser. No. 650,249, filed Sept. 13, 1984, and now abandoned.

BACKGROUND OF THE INVENTION

This invention relates to a method for use in prevention of plate deformation due to welding thin-gage plates and frames of structures built in rolling stocks, marine vessels, buildings, etc.

In keeping with the recent strong demand for lighter structure in rolling stocks for example, much headway has been made in the use of thin-gage plates for rolling stock structures, more specifically for flat plate welded structures. Aforesaid plates are thin-gage plates of mild steel, stainless steel, aluminum alloy, etc. As thin-gage plates are being widely used, deformation of plates associated with welding is causing problems in view of local stress and appearance of deformed plates.

To solve the problems, as is well known, the three following methods have been used so far:

The first method is shown in FIG. 3. Firstly a plate (a) is welded to a frame (b). Then the plate is locally heated with torch (c) (in the figure, individual points (d) are heated), and further water is applied to the points with hose (e) for quenching. This method is not efficient for its labor required, but also it has a drawback that heated areas are discolored due to the aforementioned local heating, in the case that the plate (a) is of stainless steel.

The second method is represented in Japanese Patent Publication Sho-53-39261. In this method, plates are pulled with strechers while tack-welded to frames. Such welding under pre-tension and successive relief of the tension causes residual tensile stress in the plates, thus resulting in the elimination of the deformation. But this method, on the other hand, depends on an extensive stretching apparatus, resulting in expensive facility cost. Furthermore, in the case that there is an opening in a plate, the opening in a plate prevents the plate from being evenly stretched, thus creating another drawback.

The third method is exemplified in Japanese Patent Publication Sho-53-39262. In this case, with heaters placed close to or in contact with local portions of a plate for heating, the plate is tack welded to a frame while expanded due to heat. Stop of heat supplied from heaters to the plate after welding permits the gradual cooling of the plate, which should lead to deformation due to heat shrinkage. But restriction of the deformation takes place thanks to the frame which has been welded to the plate and causes residual tensile stresses in the plate, thus preventing the plate from being deformed. But this method involves local heating of the plate with heaters, so that it would be impossible to heat uniformly over the whole area of the plate, thus resulting in a poor preventive against plate deformation. On the other hand, it is extremely difficult to exactly control setting temperatures for heating the plate with heaters.

SUMMARY OF THE INVENTION

In view of the aforesaid drawbacks in the prior art, it can be said that the purpose and object of this invention is to provide a method for welding a flat plate welded structure which causes no such unfavorable outward appearance as discolor of plates welded to frames, and eliminates the need for excessive facilities as well as fully prevents plates from being deformed due to welding.

The purpose is attained in manufacturing structures through a process of welding thin-gage plates and frames of mild steel, stainless steel, aluminum alloy, etc. by: preheating the whole plate in a heating chamber to a given temperature: immediately placing the plate on the top surface of the aforesaid frame while thermally expanded due to the preheat: then tack welding at places as required and proceeding to fully weld: and providing the plate with residual tensile stresses thanks to thermal shrinkage accompanying the lowering of plate temperature after their welding.

This method provides for the following noticeable effects:

(1) With a heating box employed, this heating method permits the whole plate to be preheated rapidly and evenly:

(2) Easy to heat plates to temperatures as necessary:

(3) Selection of proper setting temperature eliminates the need for repeated heating and cooling after welding for adequate cooling, thus achieving substantial reduction in manhours: and (4) Deformation due to thermal shrinkage following the cooling of the plate after welding yields uniform tensile stresses in the plate, thus preventing the plate from being slack, not only for excellent appearance but also for acceptable stress levels.

BRIEF DESCRIPTION OF THE DRAWINGS

FIGS. 7(a), 7(b), 8(a), 8(b), 9(a) and 9(b) are drawings illustrating measurements of residual stresses in a flat plate welded structure manufactured according to the invention.

DESCRIPTION OF THE PREFERRED EMBODIMENTS

Figure 1:
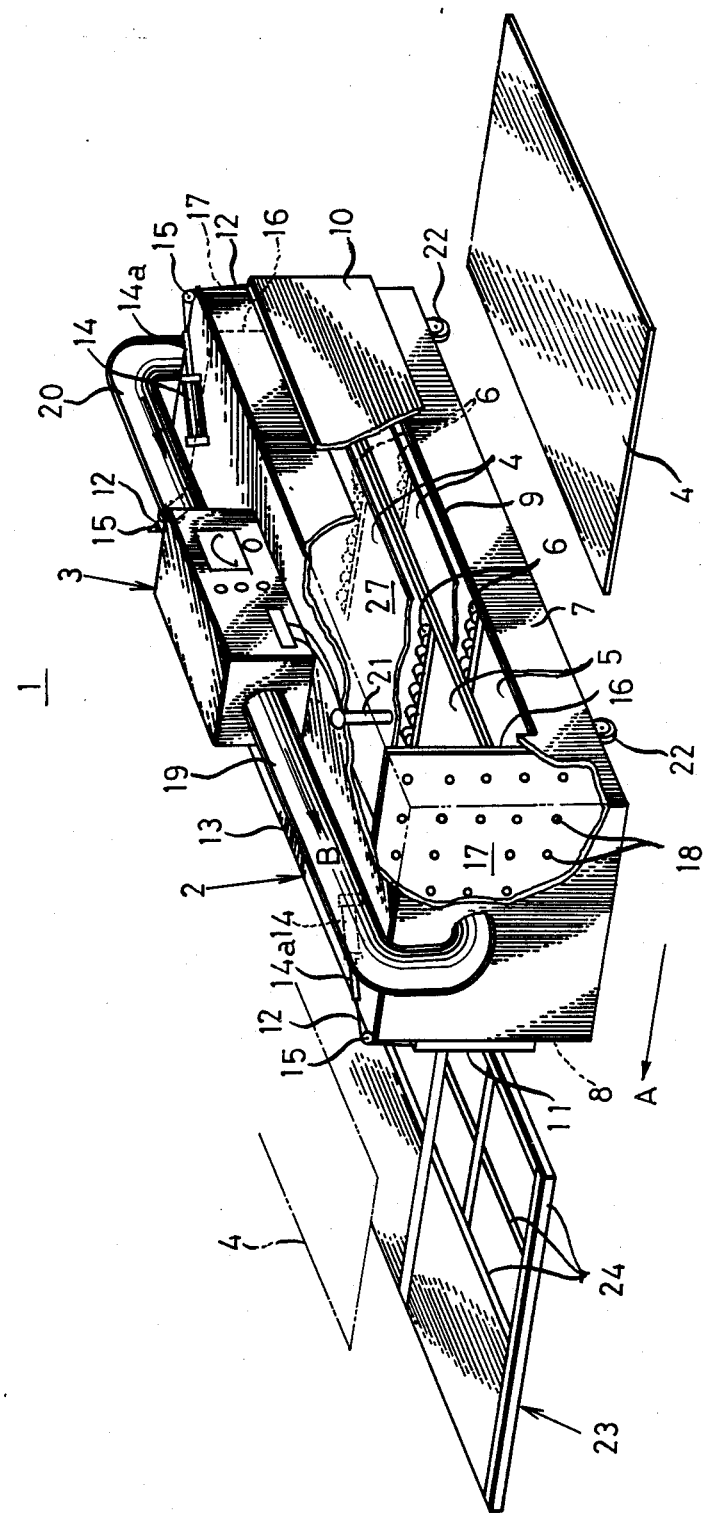
FIG. 1 is a perspective view showing one example of apparatus according to this invention.

In FIG. 1, a heating system 1 for preheating flat plates 4 is equipped with a heating box 2 and hot air type heater 3. The heating box 2 is an enclosed box lined with insulators on the inside surface. The inside of the heating box works as a heating chamber 27. Inside the said heating chamber 27 a plurality of rows of shelves 5 is installed to load flat plates 4 on, each shelf having respective roller conveyors 6 to feed plates 4 in the direction of arrow A. The front side plate 7 and rear side plate 8 on the heating box 2 have respectively a loading opening 9 and unloading opening (not shown)

which are so constructed that they respectively can be opened or closed by doors 10 and 11.

One example of doors has wires 12, one end of each wire is connected to either top end of the doors 10 and 11, and the opposite end of said wire 12 is linked to a piston rod 14 *a* in an air cylinder 14 mounted on the top board 13 as well as the wire is supported by a support pulley 15 at the middle point. The air cylinders 14 open and close the door 10 and 11 vertically.

Both sides of the heating chamber 27 have a flow straightening chamber 17 partitioned by a bulkhead 16, in which a number of small holes 18 are drilled. Both flow straightening chambers 17 respectively are partly opened to install the air supply duct 19 and air return duct 20 of the hot air type heater 3, which help circulate air toward the direction of arrow B between the hot air type heater 3 and the heating box 2.

Installed on the center of the top board 13 of the heating box 2, the hot air type heater 3 is equipped with a temperature control so that the inside of the heating chamber 27 can be held to a given set temperature T. A temperature sensor(s) 21 such as thermo-couple, a temperature detecting means for aforesaid temperature control, is installed in the heating chamber 27. The structural numerals 22 represent casters which permit the heating box 2 to move as required for the manufacturing process.

Once the hot air type heater 3 is operated, hot air is generated by said hot air type heater 3, and fed into one flow straightening chamber 17 through the air supply duct 19, before the air is gradually supplied into the whole inside of the heating chamber 27 through small holes 18 in the bulkhead 16. On the other hand, the air in the other flow straightening chamber 17 is returned to the hot air type heater 3 through the air return duct 20, and circulated between the hot air type heater 3 and the heating chamber 27, thus allowing the temperature in said heating chamber 27 to be controlled to the set temperature T.

Now we explain aforesaid set temperature T. A temperature T is so established that tensile stresses as desired can be distributed in the plate 4, when the material of the plate 4, the ambient temperature, time required for handling and tack welding the plates, and the strength of the frame 23 are taken into consideration.

Let us take one example for explanation. The following are the conditions; where thickness of the plate 4 is 1.5 mm; material is stainless steel; ambient temperature is approximately 20° C.; and time required for unloading and tack welding a plate 4 is less than 90 seconds.

Figure 4:
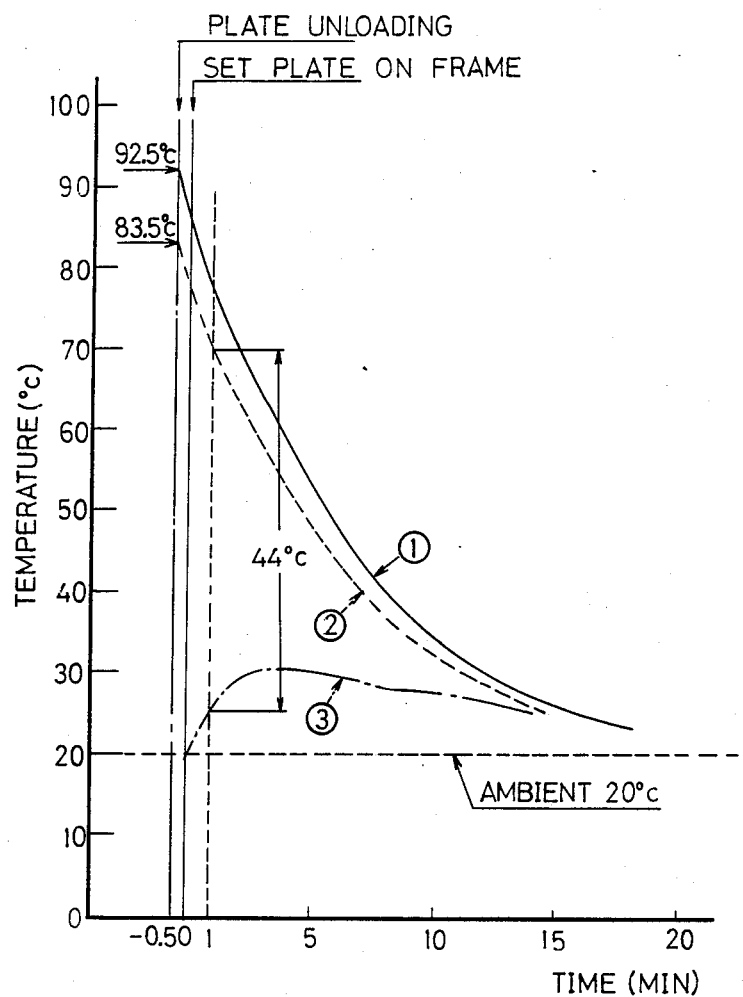
FIG. 4 is a graph showing cooling curves.

In stainless steel flat plate welded structures which are manufactured mainly by spot welding, the tensile stress which is required to prevent welded plates 4 from being deformed or slackened is 15 Kg/mm². And the temperature difference X between a plate 4 and a frame 24 (mentioned later) necessary for producing the tensile stress is given by the following formula.

$$X = K \cdot \sigma / \sigma_y,$$

where
$\sigma$: tensile stress
$\sigma_y$: yield stress or proof stress
$\kappa$: temperature difference which causes tensile stress equivalent to $\sigma_y$ From the above formula and the values obtained from experiments, $\sigma = 15$ Kg/mm², $\sigma_y = 52.7$ Kg/mm², $K = 154°$ C., the temperature difference X required is found to be approximately 44° C. Since the temperature difference X required here is the one necessary after tack welding is finished, assuming that the time required for tack welding is some one minute and that the ambient temperature, viz. the temperature of frame 24 is 20° C., an inverse operation using cooling curves of the plate 4 which are obtained after being placed on a frame (explained later in FIG. 4) shows that the initial temperature, viz. the aforesaid setting temperature T is approximately 90° C. to obtain some 44° C. of temperature difference X in course of one minute after unloading the plate 4.

Now we explain how to assemble a flat plate welded structure using the aforesaid heating system 1.

Figure 2:
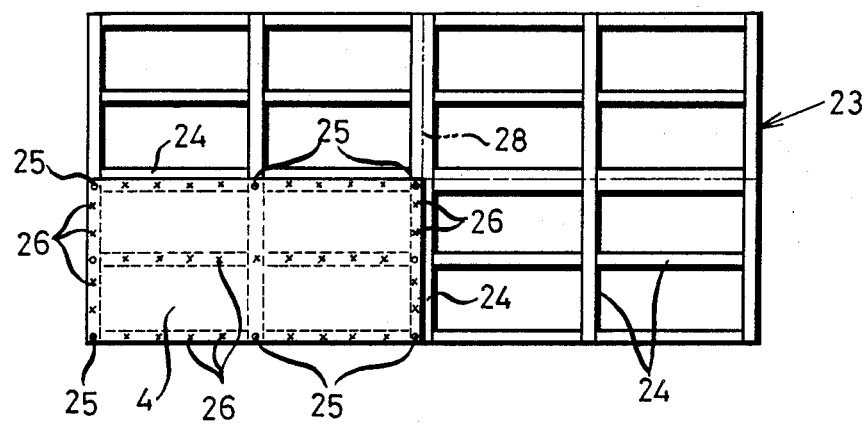
FIG. 2 is a plan illustrating one example of flat plate welded structures manufactured according to the invention.
Figure 3:
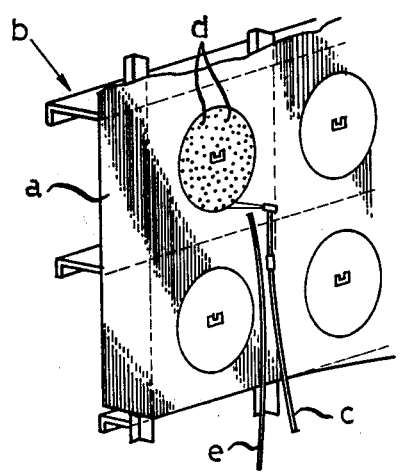
FIG. 3 is an explanatory drawing of the prior art for use in prevention of plate deformation.

(I) Load the plate 4 which has been cut to a partition line 28 (refer to FIG. 2) on a framing 23, on the shelf 5 in the heating chamber 27 in the heating box 2, and close the door 10 for heating the plate for a length of time required.

(II) After an elapse of a given time, open the door 11 to unload from the heating chamber 27 the plate 4 which is preheated to the setting temperature T, for instance some 90° C., and rapidly place the plate 4 which is thermally expanded from this preheating, on the frames 24 to match the partition line 28 on the framing 23. Unloading of the plate 4 shall be done with the heating system 1 moved close to the assembly line stated below, if the location where the plate 4 is loaded into the heating system 1 is rather distant from an assembly line of framing 23.

(III) After placement of the plate 4, spot or tack weld (shown by circles in FIG. 2) the necessary points 25 of the plate 4 to the frame 24, within a time required, for example 1.5 to 2 minutes including the setting time of the plate 4. If the ambient temperature is so low as to quicken temperature fall, the surface of the plate should be insulated and the tack welding may be done by two or more welders for a short elapsed time.

(IV) Finally the remainder 26 (shown by X in FIG. 2) of the plate 4 is spot welded to the frame 24, and cooled down to the ambient temperature as it is, for completing the assembly, when the residual stresses in the plate 4 which are maintained within 3 to 5 Kg/mm² in the direction of principal stress prevent the plate from deforming under normal conditions.

(Examples of test)

Using the method explained in aforesaid embodiment, a flat plate welded structure was made by welding plates on frames, on which a train of tests was conducted to determine the cooling curves and residual stresses. Now we explain the results.

(1) Cooling curve

Figure 5:
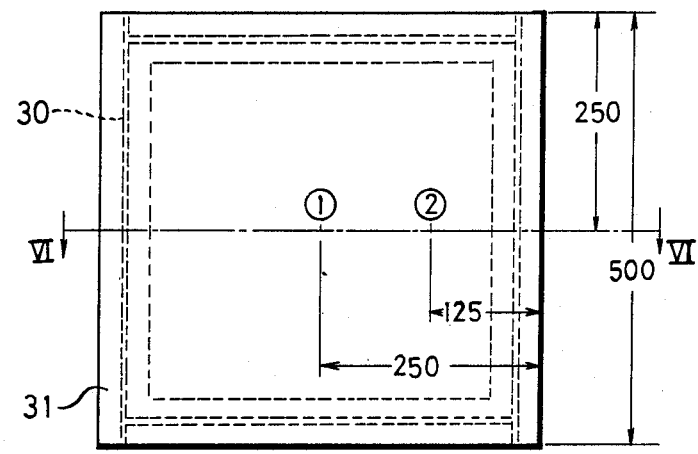
FIG. 5 is a plan of flat plate welded structure model used to obtain the cooling curves.
Figure 6:
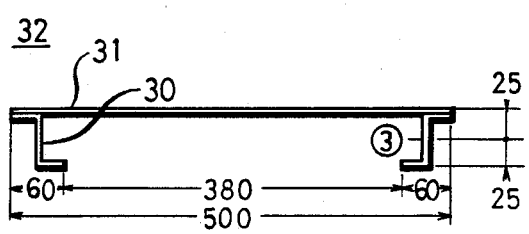
FIG. 6 is an elevation sectioned on the plane of the line VI—VI in FIG. 5.

As shown in FIG. 5 (plan) and FIG. 6 (elevation mid-sectioned on the plane of the line VI—VI in FIG. 5), stainless steel angles (30×50×30 mm) of 1.5 mm in thickness are used to form a square box-shaped frame 30, on whose top surface a stainless steel plate 31 (500×500 mm) of 1.5 mm in thickness is welded according to the invention to construct a model 32. The dimensions in FIGS. 5 and 6 are represented by the mm. In manufacturing the model, contacting surface termometers are set to the temperature measuring points ①, ②, and ③ on the model 32. The plate 31 heated is unloaded and welded to the frame 30. Temperature changes at the temperature measuring points ①, ②, and ③ are measured to obtain the results shown in FIG. 4, where temperature changes at the points ①, ②, and ③ are shown respectively by solid, broken and dotted lines.

In the case of the temperature measuring point 1 on the plate, it takes nearly 20 minutes for the plate temperature of approximately 85° C. at the time when it is placed on the frame to drop off to the ambient temperature of 20° C.

(2) Residual stress

As shown in FIGS. 7(a) through 9(b), stainless steel angles (65×65×65 mm) of 6 mm in thickness are used to form a rectangular box-shaped frame 33, on whose top surface a stainless steel plate 34 of 1.5 mm in thickness is welded according to the invention to construct models 35.

Referring to the model shown in FIGS. 7 (a) and (b) as No. 1, the one in FIGS. 8 (a) and (b) as No. 2, and the one in FIGS. 9 (a) and (b) as No. 3, these manufacturing conditions are listed in the following table 1.

TABLE 1

| Model No. | Welding condition | Plate setting temp |
|---|---|---|
| No. 1 | Only tack-welded (Note 1) | 90° C. |
| No. 2 | Spot-welded (Note 2) | 75° C. |
| No. 3 | Spot-welded (Note 2) | 90° C. |

Note 1: Spot welding is not performed but only tack welding.
Note 2: Spot welding is performed after tack welding.

In each of FIGS. 7 (a) through FIG. 9 (b), the pointing numerals ① through ⑩ represent the measuring points of residual stress, the size of the circle at each point represents the magnitude of stress, and the arrow represents the direction of each principal stress.

Figure 10:
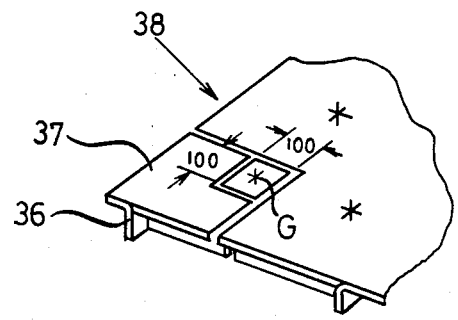
FIG. 10 is a perspective drawing showing how to relieve stress.

The method of measuring residual stresses here adopted so-called stress release process, that is: as shown in FIG. 10, a strain gage G is attached on a flat plate welded structure 38 and a 100 mm square of the plate is cut out with contour machine around the point where the strain gage is attached. Residual stress is determined from the difference between the strains before and after cutting.

Figure 11:
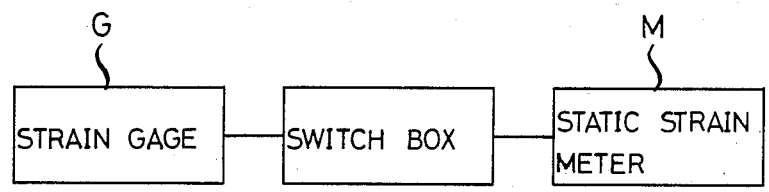
FIG. 11 is a block diagram explaining how to measure strain.

As shown in FIG. 11, the strain measurement with aforesaid strain gages G is performed by reading the output of the strain gages G through static strain meter M. In calculating stress from stain readout, the following conversion is used:

$$\sigma = \epsilon.E,$$

where $\sigma$ is stress (Kg/mm$^2$),
$\epsilon$ is strain (mm/mm), and
E is Young's modulus (assumued to be 19500 Kg/mm$^2$)

What is claimed is:

1. A preventive method for plate deformation due to welding in constructing flat plate welded structures made of thin-gage plates and frame comprises the steps of:
   (a) preheating a whole plate uniformly in a heating box to a given temperature at a first location, heating said plate in said heating box with flowing hot air;
   (b) unloading the preheated plate from said heating box to the atmosphere at a second locatio which is spaced apart from said first location;
   (c) permitting said unloaded preheated plate to begin cooling to the atmosphere; and
   (d) during such cooling to the atmosphere at said second location,
       (1) placing said plate onto a top surface of a frame which has not been preheated;
       (2) tack welding said preheated plate to said frame at a plurality of points along the outline of said plate, which points are set apart from each other at a substantial distance, during the process of cooling to the atmosphere and during the time in which the temperature of said preheated plate is higher by a predetermined degree than that of said frame, so as to cause tensile stresses between said plate and said frame;
       (3) fully welding the tack welded plate to said frame at a plurality of points between the tack welded points; whereby
       (4) thermal shrinkage deformation occurs when the fully welded plate cools.

2. A method as claimed in claim 1, wherein said plate is made of stainless steel and said predetermined degree of temperature is more than 44° C.

3. A method as claimed in claim 1, wherein the temperature of said preheated plate when just unloaded from said heating box is more than 70° C. higher than the ambient temperature.

4. A method as claimed in claim 1, wherein said tack welding and said fully welding are achieved with said preheated plate and said frame each not being connected by any connecting means.

5. A method as claimed in claim 1, wherein said tack welding and fully welding are both spot welding.

* * * * *